Sept. 4, 1934.   J. G. ZIMMERMAN   1,972,123
SHADOW PROJECTOR
Filed May 16, 1931   3 Sheets-Sheet 1
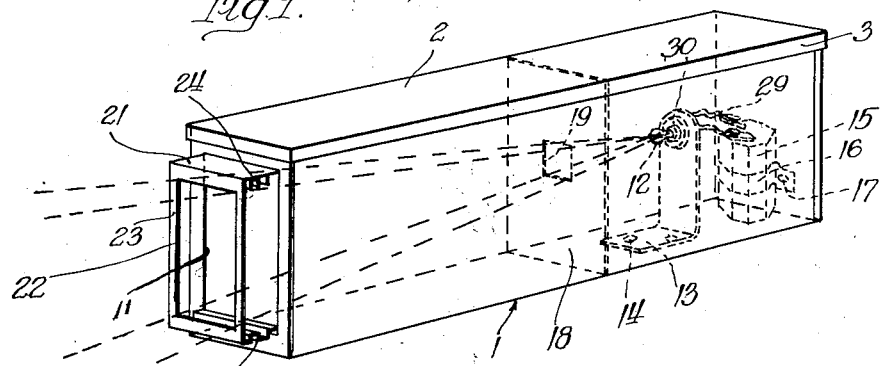
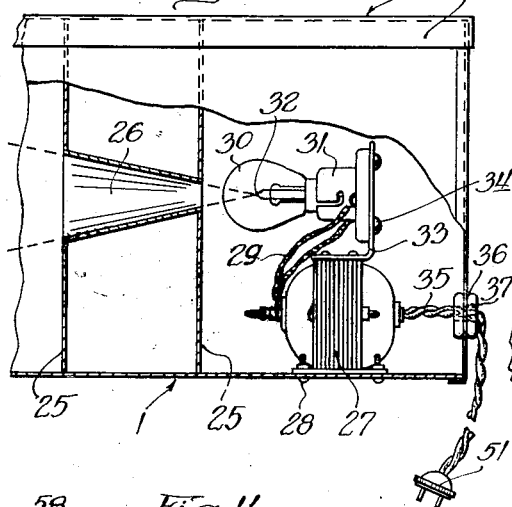 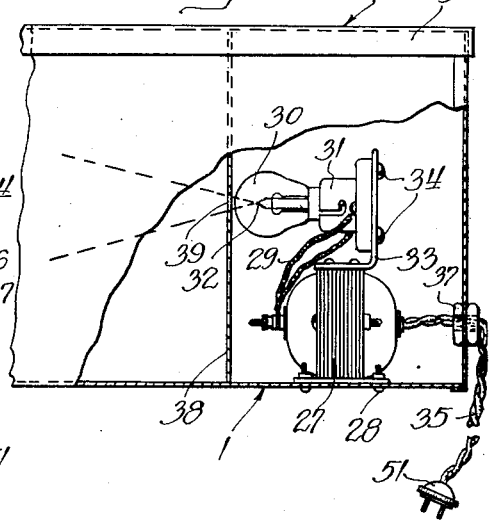
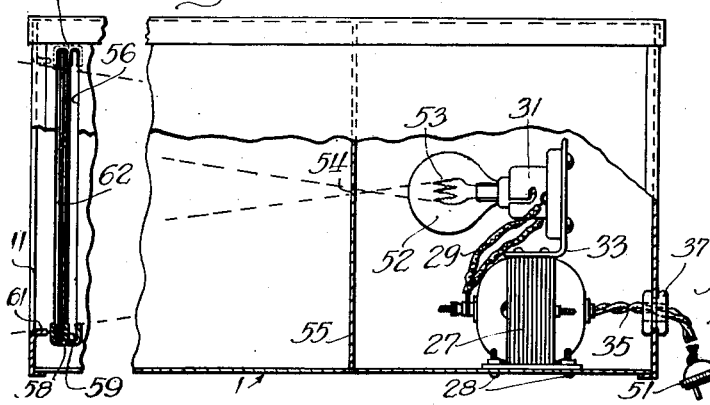
Inventor:
James G. Zimmerman.
By Brown, Jackson,
Boettcher & Dienner
Attys.

Sept. 4, 1934.  J. G. ZIMMERMAN  1,972,123
SHADOW PROJECTOR
Filed May 16, 1931   3 Sheets-Sheet 2
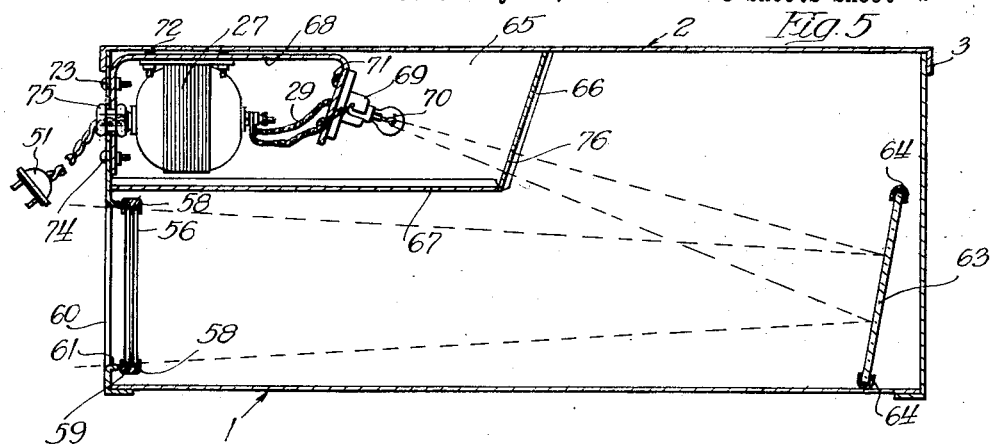
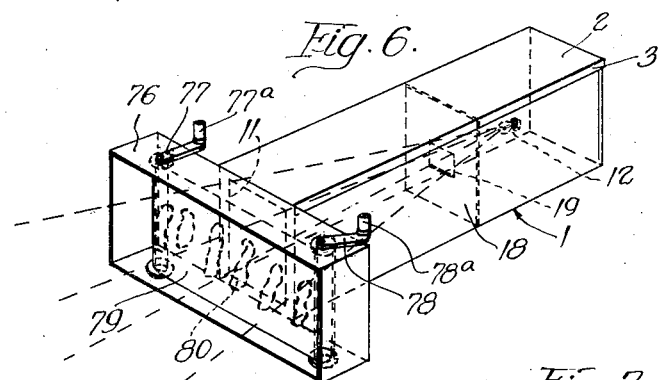
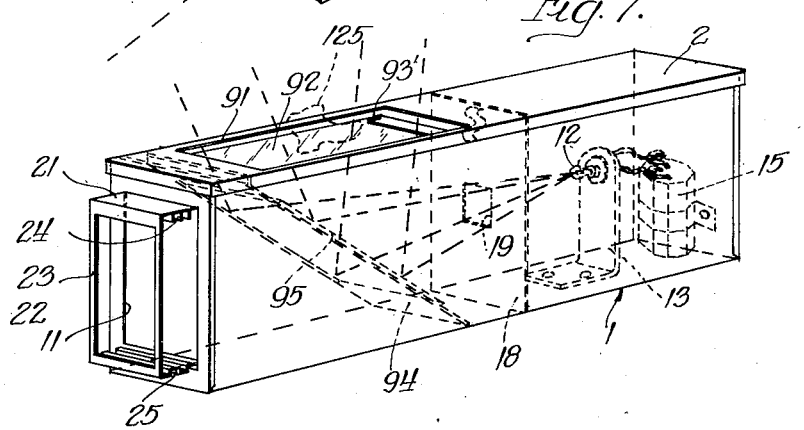
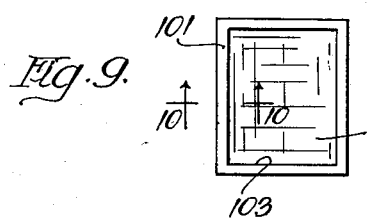
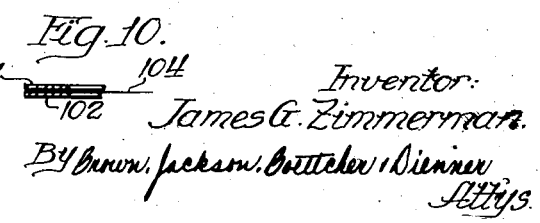
Inventor:
James G. Zimmerman.
By Brown, Jackson, Boettcher & Dienner
Attys.

Sept. 4, 1934.  J. G. ZIMMERMAN  1,972,123
SHADOW PROJECTOR
Filed May 16, 1931  3 Sheets-Sheet 3
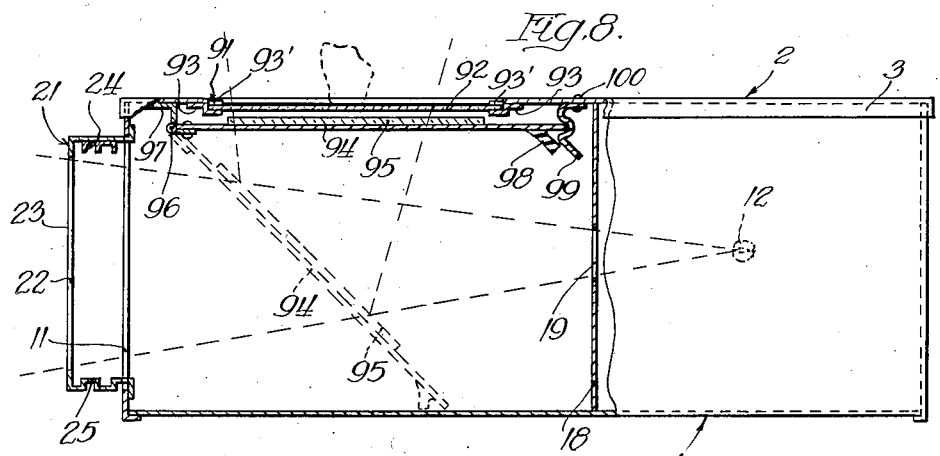
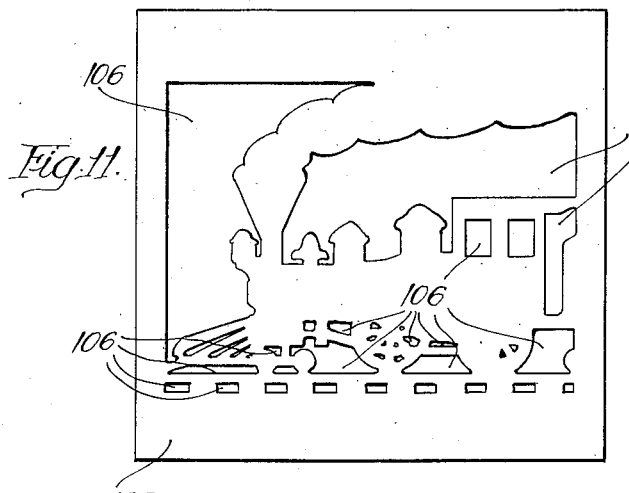
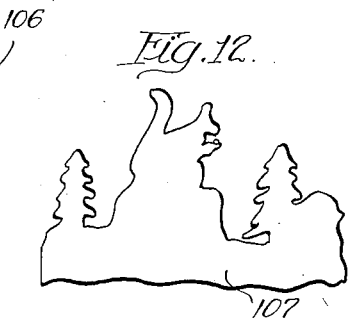
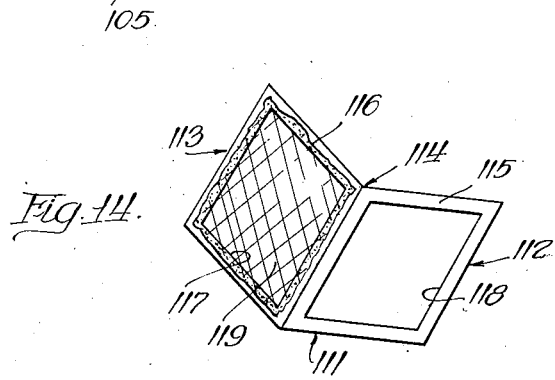
Inventor:
James G. Zimmerman.
By Brown, Jackson, Boettcher & Dienner
Attys.

Patented Sept. 4, 1934

1,972,123

UNITED STATES PATENT OFFICE 1,972,123

SHADOW PROJECTOR

James G. Zimmerman, Madison, Wis.

Application May 16, 1931, Serial No. 537,768

4 Claims. (Cl. 40—130)

This invention relates to projector devices, and more particularly to shadow projector devices.

One of the objects of my invention is to provide a shadow projector having a point source of light, constructed without the customary reflectors, condensers, or lenses, and operative to project shadow pictures on any suitable vertical or horizontal surface.

Another object of my invention is to provide a projector of simple, inexpensive and durable construction, designed to be used by young and old alike as an educational and amusement means, as well as for other purposes, such as commercial advertising.

Another object of my invention is to provide a projector wherein shadow pictures may be projected either horizontally or vertically without changing the position of the projector.

Another object of my invention is to provide a shadow projector device having a point source of light and having a series of silhouette objects mounted on an elongated transparent film material, whereby the film may be moved across the projection end of the device, such as by being mounted on suitable manually operable rollers.

A further object of my invention is to provide suitable slide structures of inexpensive, simple and durable construction on which a transparent material is mounted on a frame and on which the objects to be projected, such as silhouettes, are mounted.

A further object of my invention is to provide a suitable slide structure comprising a frame having a transparent backing material, such as loosely woven fine gauze or chiffon, stretched or mounted on one side thereof so as to provide a means for receiving objects to be projected, such as pictures and the like.

Heretofore, shadow projectors have been of expensive and fragile construction, due to the use of glass condensers or lenses, reflectors and the like, so that it has not been feasible to permit children to use them as a toy, amusement or educational device.

The present invention contemplates an apparatus or device, both durable and inexpensive, which is designed to be safe when used by children, and also one which has commercial value, such as for projecting advertising slides in public places, as in ordinary retail stores or show places.

The type of slide which I prefer to use with my device, is one having a transparent backing means mounted on an inexpensive frame and on which suitable objects may be mounted, as will be hereinafter more fully explained. I prefer to use a backing of cloth, fabric or other diaphanous material having a fine texture, loosely woven, such as chiffon cloth or florist's ribbon, which, when stretched onto a suitable frame, will permit light to pass therethrough substantially unobstructed, for projecting shadows of any objects mounted thereon, and yet such cloth backing will not be projected.

Preferably, I secure a point source of light by use of an opaque diaphragm, having an opening therein for defining, collecting or concentrating the light rays, in conjunction with a light, said diaphragm being spaced between the light and the object or objects to be projected. The size of said opening in the diaphragm, and the positioning of said diaphragm relative to the light, being dependent upon the size or strength of the light bulb used and the size of the filament area of said bulb, as will be hereinafter more fully explained.

I provide means at the end of the projector opposite the light source for receiving and holding the slides to be projected. More particularly said means is in the form of an extension on the projector having a plurality of guide ways for receiving one or more slides.

In another modified form of a device embodying the salient features of the present invention, the slide receiving or guide means for the slides are mounted at one end of the projector, but inside thereof.

By providing a point source of light having a sharp definition, pictures or shadows may be projected clearly without lenses and the like, and the projector will always be in focus without regard to the distance from the screen or object on which the light is to be projected. My device is safe for children, also, because of the absence of breakable parts and because of being of low power consumption, my device being adapted to be operated by a small flashlight bulb and battery. I may also use a transformer or other suitable resistance for reducing ordinary house current, in which case different strength bulbs having different filament areas may be used. Because of said sharp definition or point source of light, large area slides, impossible to be projected with a poor source of illumination or with lenses, except the most expensive ones, are successfully projected by my improved device.

In addition, I provide means for projecting shadows, images and the like without having to change the position of the projector. In this modification, objects and designs may be projected on a horizontal surface above the projector, such as a ceiling, or they may be projected on any suitable vertical surface, such as a wall or a portable screen. This characteristic, of adaptability for either horizontal or vertical projection without having to change the position of the projector, I preferably accomplish by means of a hinged reflector adapted to be swung down from the cover of the projector into the light beam for reflecting the same up through an opening in the cover, which, when not in use for that purpose, is so hinged as to close said opening in the cover and permit the light rays to pass through the end of the projector for ordinary horizontal projection onto a vertical surface, as hereinafter more specifically explained in the detailed description.

I have found that certain smooth and clear materials, like celluloid, cellophane, or the like, work equally well as a backing, when mounted on the frame of the slides. Such material is advantageous in that it permits the pasting of shadow cut-outs thereon, and in the event that paste or glue is smeared on the background, the same may be easily washed off. Also, the slides are apt to become dirty, and such material permits of cleaning. Glass is not a safe material to be used in the making of slides, when small children are allowed to use them. However, I wish to be understood that regular lantern slides properly may be used with my device. My projector has an advantage over the ordinary magic lantern in that a child may prepare his own slides from time to time, it being apparent that in that way my device amounts to an educational device for the child which adds incentive and interest to his endeavors.

Further objects and advantages of my invention will appear from the following detailed description of a preferred embodiment thereof, illustrated in the accompanying drawings, in which:

Figure 1 is a perspective side view of one form of my projection apparatus;

Figure 2 is a partial fragmentary longitudinal sectional view of a modification;

Figure 3 is a fragmentary vertical longitudinal sectional view of another modification;

Figure 4 is a fragmentary longitudinal sectional view of a third modification;

Figure 5 is a vertical longitudinal sectional view of a modification, in which the light is mounted at the same end which is adapted to receive the slides;

Figure 6 is a perspective view of a modification showing a continuous film mounted on a plurality of manually operable rollers;

Figure 7 is a perspective of a modification, in which shadow pictures may be adapted to be projected both vertically as well as horizontally; the apparatus being shown in a horizontal position for vertical projection;

Figure 8 is a vertical longitudinal sectional view of the modification shown in Figure 7 except that the device is in condition for horizontal projection;

Figure 9 is an elevational view of one of my slides;

Figure 10 is a sectional view taken on the line 10—10 of Figure 9;

Figure 11 is an elevational view of a one piece cut-out slide;

Figure 12 is an elevational view of a silhouette cut-out;

Figure 13 is an elevational view of another of my slides; and

Figure 14 is a perspective view of my improved folding slide.

Referring now to Figure 1, I provide an elongated box 1 of suitable opaque material, such as of sheet metal, having a removable cover 2 with depending flanges 3. An opening 11 is provided in one end of the box 1, and in said opening is mounted, as by welding, a slide receiving extension means 21, having an opening 22 in alinement with the opening 11 and of equal size therewith. Connecting uprights 23, and guides 24 and 25 are secured to the top and bottom inner portions thereof, respectively, for receiving slides.

At the other end of the box is mounted a flashlight or other small bulb 12, suitably mounted in a socket 30 on a bracket 13, suitably held to the bottom of the box 1 as by a bolt or rivet 14. A suitable lantern or dry battery 15 is clamped at that end in the box by means of a strap loop 16 held by rivets 17. The bulb 12 has suitable wiring connections 29 secured to said battery 15. In the box 1 between the light 12 and the opening 11 at the other end thereof is mounted a diaphragm 18 or light defining means having an opening 19 therein for collecting and concentrating light rays from the bulb 12, so that said rays will be projected through the opening 11 at the other end of the box and against any slides which may be in the slide receiving means 21. The area of the opening 19 is such that the light passing therethrough just covers the opening 11.

The bulb 12 is one having a small filament providing substantially a point source of light, which, in conjunction with the diaphragm 18, fixedly mounted in the box 1 between said light and the opening 11, throws a sharp definition of light rays through the opening 19, the opening 19 being of such size as to define the light rays striking a slide in the slide receiving means 21 so that the light striking the slide is of substantially equal size with the slide.

In the modification shown in Figures 2 and 3, a bulb 30 is mounted in a socket 31 on a bracket 33 mounted on a transformer 27 which, in turn, is mounted on the bottom of the box 1 as by bolts 28. The wire 35 leading from the transformer, for connection with ordinary house current, having the customary plug or cap 51 at one end thereof, is provided to extend through an opening 36 at that end of the box 1 and through an insulating bushing 37 in said opening. Suitable connections 29 extend from the transformer to the bulb. In this modification, I use an ordinary automobile headlight bulb connected to the house current, a transformer being provided to reduce the voltage to the amount suitable for the bulb. Said bulbs are of the type having practically a point source of light, or a small filament area 32.

In order to provide a sharp definition of rays I provide a diaphragm, such as illustrated in Figure 2. This diaphragm consists of two plates 25 secured inside of the box 1 in parallel spaced relation and having a cone or funnel 26 connecting said plates, as by being welded thereto, and centrally thereof in alinement with the filament 32 and the opening 11 at the other end of the box 1. Obviously such a diaphragm constitutes a means for defining the light rays emanating from the bulb 30 and acts as a concentrating means for directing said rays against any slides in the slide receiving means 21 at the other end of the box. It will be noted that the diaphragm shown in Figure 2 is in spaced relation from the bulb 30.

The present invention also contemplates a diaphragm 33 such as shown in the modification illustrated in Figure 3 which has been found to operate successfully. This diaphragm consists of a single plate 38 welded inside the box 1, between the light 30 and the other end of the box, and having a suitable opening 39 therein in order to direct the rays from the bulb 31 against the slide or slides to be projected in the receiving means 21 at the other end of the box.

The modifications shown in Figures 2 and 3, permit the use of a stronger bulb than the one shown in Figure 1 and one which provides substantially a point source of light, which in conjunction with either of the diaphragms shown, provides a sharp definition of the projected silhouette or other object.

In the modification shown in Figure 4, I provide means for receiving the slides 62 mounted at the end of the box adjacent the opening 11 and inside of the box instead of outside as shown in Figure 1. Preferably such means takes the form of guide brackets 58 mounted adjacent the top and bottom portions of the box and near the opening 11 and having grooves 59 therein for receiving the frames of the slides 62. Said guides 58 are secured inside of the box 1, as by welding, to the sides thereof.

Like the modifications of Figures 2 and 3, the modification of my invention shown in Figure 4 embodies the salient feature wherein a larger and stronger electric light bulb 52 may be used. My invention contemplates the use of a bulb either in direct connection with the usual house current, or a bulb of smaller capacity can be used in connection with a transformer 27, as illustrated, suitably mounted on a bracket 33 and socket 31. Such a bulb has a large filament area as at 53, and in order to produce a sharp definition of light I provide a diaphragm 55 having a small opening 54 therethrough positioned in alinement with the center of the bulb 52 and the center of the opening 11 at the other end of the box 1. This permits a stronger bulb to be used and yet, by means of the diaphragm 55, I secure practically a point source of light.

In the modification shown in Figure 5, I mount the lamp 70 on a socket 69 and bracket 68 secured to the upper left hand portion of the box 1 by means of bolts 73. The transformer 27 is mounted to the underside of the bracket 68 by means of bolts 72, and has the usual connecting wire and plug 51 for connection with the ordinary house current. Suitable wires 29 connect the transformer with the bulb 70. The lamp and transformer are mounted in a separate light-proof enclosure or compartment 65 in the upper left hand portion of the box 1, which compartment is formed by welding a piece of sheet metal 67 or other opaque material to the end and side portions of the box, as shown, and connecting said piece 67 with another piece 66, welded to the side portions of the box and to the piece 67, thus forming an opaque partition, so that the compartment 65 is completely separated from the rest of the box. An opening 76 is provided in the piece 66, for a purpose to be hereinafter described.

An opening 60 is provided in the end of the box under the compartment 65, adjacent the transformer, as illustrated, and guide members 58 are secured inside of the box, as by welding to the walls thereof, for receiving slides. Grooves 59 are provided in the guide members 58 for the purpose of loosely receiving the frame of the slides, and the sides of the box 1 are cut away at 56 to allow insertion of the slides. A plane reflector 63 is mounted at the other end of the box 1 from the opening 60 by means of brackets 64 welded or otherwise secured to the sides of the box and at an angle so as to reflect the light from the bulb 70, received through the opening 76 in the piece 66, through the opening at 60 at the other end of the box.

The partition, composed of the opaque pieces 66 and 67 having the opening 76 therein, constitutes means for directing the rays of light from the lamp 70 towards the reflector 63. This modification of my invention permits the use of a more powerful lamp, such as 70, having a less concentrated filament area.

In the modification shown in Figure 6, I provide a projector box, similar to that shown in the modification in Figure 1, having the diaphragm 18 and opening 19 therein and the bulb 12 mounted therein, as in Figure 1, but instead of the slide receiving means 21 mounted in the opening 11 at the projection end of the box, I mount an open sided boxlike structure 76 at that end of the box adjacent the opening 11, said structure 76 having an opening corresponding with the opening 11. Rollers or reels 77 and 78 are mounted in the top and bottom sides of the box frame 76, each being provided with handles 77a and 78a, respectively, for manual operation. An elongated transparent film or backing 79 has its ends mounted on said two reels. Said backing is of any suitable transparent material, such as fine loosely woven gauze, and is adapted to receive opaque objects 80 mounted, as by pasting, thereon. This construction permits shadow pictures to be projected, when said opaque objects are opposite the opening 11, and permits movement of said objects across said opening, as will be readily understood, by manual operation of one or the other of the handles 77a and 78a.

In another modification of my invention, illustrated in Figures 7 and 8, I provide a projector of similar structure to that illustrated in Figure 1, but having an opening 91 in the cover 2 thereof at the end of the box adjacent the slide receiving means 21 and between the diaphragm 18 and the opening 11 at the end of the box. Transparent material 92, such as glass, is suitably held in place in the opening 91 by means of brackets 93 which are welded to the under side of the cover 2 adjacent the opening. The member 92 is securely held in place by means of bentover portions or ends 93' extending around the glass 92 at either side thereof. A reflector, such as a plane mirror 95, is suitably secured to a hinged member 94 inside and under the cover 2 and opening 91 by means of a hinge 96 and a bracket 97, the latter being suitably secured to the under surface of the cover 2. The member 94 is adapted to be swung into the position illustrated in dotted lines, whereby light rays from the bulb 12 striking the reflector 95 will be reflected vertically through the opening 91. A resilient stop member 98 is secured adjacent the end of the member 94 which rests on the bottom of the box 1. The member 98 thus acts as a cushioning stop means when the member 94 is lowered by being swung on the hinge 96 into its inclined position.

This structure presents a projection device which can be used for either horizontal or vertical projection without changing the position of the device. When the device is used to project light upwardly objects or slides may be placed on the glass 92 or over the opening 91 and shadow pictures thus projected onto the ceiling or the like. In this respect a device constructed according to the invention may find an extensive field of usefulness in hospitals and similar institutions where, for bedridden patients, pictures thrown upwardly onto a ceiling or elevated screen can be viewed more easily.

When the reflector 95 is not being used it is placed in the position shown in full lines in Figure 8, and it is normally held in that position by means of a manually releasable spring latch 99 secured to the under side of cover 2 in any suitable manner, such as by rivets 100. When the reflector 95 and member 94 are in raised position, as shown in full lines in Figure 8, they act as a means for substantially precluding any light from leaving the box through the opening 91. This is the position these parts take when the projector is being used for horizontal projection, as illustrated in full lines in Figure 8. In this modification the mounting of the bulb 12 and of the diaphragm 18 are practically identical with that shown in Figure 1. The opening 19 in the diaphragm 18 directs the light rays emanating from the bulb 12 toward the opening 11 at the other end of the box, and when the member 94 is in inclined position said opening 19 directs the light toward the inclined reflector 95, from whence the light rays are caused to be projected upwardly through the opening 91.

I will next describe the structure of my improved slides, which I prefer to use in connection with my projector device, or box, just described.

One modification of my improved slide structure consists of a stamped or cut-out, unitary or one piece, structure, as illustrated in Figure 11, wherein a one piece slide 105 has openings 106, or cut-out portions therein, forming any suitable configuration. Said slide may be of any desirable material such as cardboard or the like. Figures 9 and 10 illustrate another embodiment of my invention wherein I provide a slide structure consisting of two frames 101 and 102 each having a central opening 103. A suitable transparent or translucent backing material 104, such as fine gauze or the like, is stretched over the openings 103 and between the frame members 101 and 102, and the two frame members 101 and 102 are then suitably secured together. It is evident that such a structure presents a means whereby any suitable object such as pictures, cartoons, or silhouettes may be glued, pasted or otherwise secured on the backing 104. In the modification shown in Figures 9 and 10 I prefer to use a fine transparent loosely woven gauze for the backing 104, such as chiffon or florist's gauze, however it is to be understood that any translucent material, such as celluloid or other nonbreakable substance, may be used instead of a gauze material.

Figure 12 is representative of any suitable silhouette object 107 which is preferably stamped or cut out of cardboard or the like and then pasted on the backing 104 of the slide structure. Figure 13 shows a slide 109 similar to Figure 9 but one employing a frame 108 which may be of single ply and having a backing 110 of cellulose acetate or similar material.

Figure 14 illustrates another modification of my invention, wherein I provide a folding frame structure 111 preferably made of one piece and comprising right and left hand frame portions 112 and 113, respectively, each having central openings 118 and 117. The portions 112 and 113 comprise frames 115 and 116 which are connected or hinged together, as at 114. A transparent backing 119 is mounted over opening 117 in the frame portion 116, as by being glued thereon, on which backing suitable objects may be mounted. By virtue of this folding frame structure it is apparent that not only may silhouette or other objects be mounted as by pasting, on the backing 119, but numerous other objects may be loosely inserted between the right and left hand frame portions as will be understood by those experienced in the art. The entire folding frame structure 111 when in folded condition may be inserted in the slide receiving means provided adjacent the projection opening of my projection device.

The transparent medium or glass 92, Figures 7 and 8, in the opening 91, being depressed below the level of the cover 2, forms a support for receiving objects to be projected vertically. Any desired object, such as represented on the member 92 in dotted lines in Fig. 7, may be laid thereon for projection.

Instead of a transformer, for reducing house current, a suitable resistance may also be used, preferably one with a plurality of taps so that the bulb may be shunted across a portion of the resistance. With a plurality of taps the portion of the resistance shunted may be varied, and hence the brilliancy of the bulb can be thus adjusted for any specific condition. This particular arrangement is advantageous in that it is safe for children to use on ordinary house current of 110 volts, either A. C. or D. C. Should the bulb burn out, the circuit through the resistance is not opened.

I have found that coloring on the backing of my slides will be projected, or the objects to be projected can be colored and slightly transparent so that the projection thereof will be colored. Where the slide receiving means has a plurality of grooves for accommodating more than one slide at a time the representations on the slides may be coordinated so that different effects may be obtained by different grouping of the slides which are simultaneously projected.

It will be readily apparent that any objects, other than slides, such as a hand, or the like, may be placed in the light beam of my device for the making of shadow pictures.

While I have shown and described various modifications of my invention, I do not wish to be limited thereto, as obviously various other modifications or changes may be made without departing from the spirit of my invention, such as adjustably mounting the diaphragm and light instead of stationarily, or the using of metal reflectors instead of glass, or the provision of a box without a removable cover, and, therefore, I only wish to be limited by the appended claims.

What I claim is:—

1. In combination, a light proof box, an opening at one end of the box, a separate light proof compartment having opaque walls in said box over said opening and at the same end thereof, a point source of light in said compartment, a reflector at the other end of the box, one of said walls of the compartment having an opening therethrough for permitting rays from the light to pass onto the reflector and out of the opening at the end of the box, and means adjacent said opening at one end of the box for receiving slides to be projected by said light rays onto a screen spaced from said box.

2. A shadow projector device comprising a box impervious to light, a source of light in the box, a reflector in the box, an opening in one end of the box, slide receiving means adjacent said opening, and opaque means for directing rays from said light against said reflector, the reflector being positioned for directing said rays through said opening onto a screen spaced therefrom, the light being positioned adjacent the end of the box having the opening.

3. In a device of the class described, in combination, an opaque box having an opening at one end, an intensified light source of small area disposed in said box, means disposed adjacent the opening in said box and adapted to receive images to be projected by the light source onto a screen spaced an appreciable distance from the box whereby the projected image will be viewed from the same side of the screen from which they are projected, and means in said box for preventing scattered light from reaching the image, said last means being spaced from the opening in said box and having an opening therein for collecting and defining the intensified rays of light which are passed through the opening in said box, the opening in said last means being of such area that the rays of light passing therethrough will be coned outwardly and concentrated over approximately the entire area of the opening in said box.

4. A projection device comprising a box having an opening therein, a source of light in said box, a reflector in said box, and opaque means for concentrating and directing the light rays from said light source onto said reflector, said reflector being so positioned as to direct said light rays through the opening in said box onto a screen spaced therefrom.

JAMES G. ZIMMERMAN.